United States Patent
Utaka

(10) Patent No.: US 8,410,657 B2
(45) Date of Patent: Apr. 2, 2013

(54) MOUNTING-STRUCTURE OF STATOR CORE ADAPTED TO ROTATING ELECTRICAL MACHINE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 13/080,904

(22) Filed: Apr. 6, 2011

(65) Prior Publication Data

US 2011/0248598 A1 Oct. 13, 2011

(30) Foreign Application Priority Data

Apr. 7, 2010 (JP) .................................. 2010-088530

(51) Int. Cl.
*H02K 1/12* (2006.01)
(52) U.S. Cl. .......................... 310/216.136; 310/216.009
(58) Field of Classification Search ........... 310/216.008, 310/216.009, 216.065, 216.113, 216.136, 310/216.137

See application file for complete search history.

(56) References Cited

U.S. PATENT DOCUMENTS

| | | | | |
|---|---|---|---|---|
| 4,114,019 A * | 9/1978 | Sandor | ...................... | 219/137 R |
| 6,246,142 B1 * | 6/2001 | Asao et al. | ............. | 310/216.136 |
| 6,448,682 B2 * | 9/2002 | Sakagami et al. | ..... | 310/216.057 |
| 6,477,761 B1 * | 11/2002 | Ohashi et al. | ................... | 29/596 |
| 6,930,428 B2 * | 8/2005 | Grundl et al. | .......... | 310/216.008 |
| 2009/0066183 A1 * | 3/2009 | Aramaki et al. | ............... | 310/217 |

FOREIGN PATENT DOCUMENTS

JP 2009-11063 1/2009

* cited by examiner

*Primary Examiner* — Dang Le
(74) *Attorney, Agent, or Firm* — Nixon & Vanderhye PC

(57) ABSTRACT

A stator core of a rotating electrical machine, in which no compressive load is applied to divided cores each having an arc shape, when the divided cores are secured into a circular form, thereby decreasing the motor loss and improving the motor efficiency. The divided cores are circularly disposed, and the divided cores each having the arc shape in section perpendicular to the axial direction of the rotary axis. In the divided cores, there are provided welded portions each of which is diagonally formed between one corner end of a connecting edge and an opposite corner end of a neighboring connecting edge, thereby providing the welded portion diagonal with respect to the axial direction. The connecting edges are in parallel to the axial direction.

2 Claims, 5 Drawing Sheets

MOUNTING-STRUCTURE OF STATOR CORE ADAPTED TO ROTATING ELECTRICAL MACHINE

CROSS REFERENCE TO RELATED APPLICATION

This application is based on and claims the benefit of priority from earlier Japanese Patent Application Number 2010-88530 filed on Apr. 7, 2010 the description of which is incorporated herein by reference.

BACKGROUND OF THE INVENTION

1. Field of the Invention

The present invention relates to rotating electrical machines mounted on vehicles and, more particularly, the present invention relates to a structure of a stator core adapted to a rotating electrical machine.

2. Description of the Related Art

Conventionally, a type of rotating electrical machine having a stator core has been disclosed. In the rotating electrical machine, the stator core is designed to be divided into a plurality of cores each having an arc shape and the divided cores are secured in a circular form. It is noted that the rotating electrical machine is used in an electric motor and a generator both mounted on an electric vehicle and/or a hybrid car.

For instance, there has been disclosed a stator core of a rotating electrical machine in Japanese Unexamined Patent Publication No. 2009-11063. As shown in FIG. 2, this stator core 2 includes divided cores 1 secured in a circular form. As shown in FIG. 1, each of the divided cores 1 has an arc shape and is made of laminated soft magnetic thin plates. As exemplified in FIG. 3, the stator core 2 having the divided cores 1, which form a circular core group, can be inserted into a tubular steel ring 3 by means of a shrinkage fit to be secured. In this securing method, the ring 3 is heated in advance to widen the aperture thereof thereby to allow the divided cores 1 in a circular form to enter the aperture. After the divided cores 1 enter inside the ring 3, the ring 3 shrinks as it returns to the normal temperature, thereby tightening and securing the divided cores 1 forming the circular form by means of the compressive stress of the ring 3.

In the conventional stator core 2, however, a motor loss is deteriorated caused by the compressive pressure of the ring 3 loading on the divided cores 1, as exemplary shown in FIG. 4. FIG. 4 shows a relationship between the compressive load (N) loading on the divided cores 1 having the circular form, and a loss density (kW/m). When the frequency is 100 Hz (f=100 Hz) and 200 Hz (f=200 Hz), which are equivalent to the excitation frequency of the rotating electrical machine, the compressive load gradually increases, whereby the loss density gradually increases, and therefore the motor loss is deteriorated. When the frequency is 400 Hz (f=400 Hz), the loss density apparently increases in the range of 0 to 10 N in the compressive load.

Moreover, as exemplary shown in FIG. 5, when the compressive pressure is loaded on the divided cores 1 having the circular form, the magnetic permeability is deteriorated, thereby causing the magnetic flux to less likely pass through the stator core 2. FIG. 5 shows a relationship between the compressive load (N) of the compressive pressure loading on the divided cores 1 having the circular form, and the relative magnetic permeability. When the frequency is 100 Hz (f=100 Hz), 200 Hz (f=200 Hz) and 400 Hz (f=400 Hz), which are proportional to the number of revolutions of the rotor, the relative magnetic permeability gradually decreases as the load gradually increases. This means that the magnetic permeability decreases and thereby causing the magnetic flux to less likely passes. In this case, the current value for forming a magnetic field increases, and thereby a copper loss generated in the coil increases.

As described above, when the compressive pressure of the ring 3 is applied to the divided cores 1 having the circular form, the magnetic property of the stator core 2 is deteriorated, and the motor loss is increased.

SUMMARY

An embodiment provides a stator core of a rotating electrical machine wherein no compressive load is applied to the divided cores, each having an arc shape, when the divided cores are secured into a circular form, whereby the motor loss can be decreased and the motor efficiency can be improved.

A stator core of rotating electrical machine according to a first aspect of the embodiment includes divided cores that are circularly disposed, via a gap, around an outer circumference of a columnar core that rotates about a rotary axis. Each of the divided cores is made of laminated steel plates having a arc shape. The divided cores are integrally connected by welded portions that are diagonally formed with respect to the rotary axis.

In this configuration, the divided cores are connected with one another by the welding unlike the conventional prior art where the divided cores are connected by means of the shrinkage fit using the circular ring.

Therefore, no compressive stress is applied to the divided cores, unlike the prior art. As a result, the magnetic property, which is deteriorated by the compressive stress, of the stator core is prevented, and thus it is possible to decrease the motor loss and improve the motor efficiency.

Moreover, the welded portion is formed diagonally with respect to the axial direction. Considering a rotor inside the stator is rotated, there is generated a magnetic field between the rotor and the stator in the radial direction, in the circumferential direction, and in the axial direction. In such a case, assuming the welded portion being formed in parallel to the axial direction, an eddy current flows at once in the welded portion caused by a variation of the magnetic field generated in both the radial direction and the circumferential direction. This can generate an eddy-current loss caused by an electrical resistance of the iron forming the welded portion. However, in the embodiment, the welded portion is formed diagonally with respect to the axial direction. Because of the diagonally-welded portion, the magnetic field in the axial direction is generated with a time lag corresponding to the rotation of the rotor, and thus the eddy current is dispersed and flows less. Accordingly, it is possible to decrease the eddy-current loss compared to the above configuration having the welded portion along the axial direction, thereby improving the motor efficiency.

A stator core of rotating electrical machine according to a second aspect of the embodiment includes divided cores each includes first and second connecting edges which are adjacent to other divided cores, and the welded portions are formed by a welding performed from one end of the first connecting edge in an axial direction to the other end of the second connecting edge in the axial direction.

Further, according to a third aspect of the embodiment, each of the welded portions is formed in the axial direction between one end of the divided cores and the other end of the divided cores with a pitch between a north pole and a neighboring south pole of the rotor.

According to this configuration, the divided cores are integrated by the welded portions formed on the outer circumference surface of the divided cores with a pitch between two neighboring poles. Therefore, an eddy current of a north pole and an eddy current of a neighboring south pole flow in the reversed direction, canceling the eddy currents with each other. This allows only small eddy currents to flow, decreases the loss due to eddy current and improves the motor efficiency.

BRIEF DESCRIPTIONS OF THE DRAWINGS

DETAILED DESCRIPTION OF THE PREFERRED EMBODIMENTS

Figure 1:
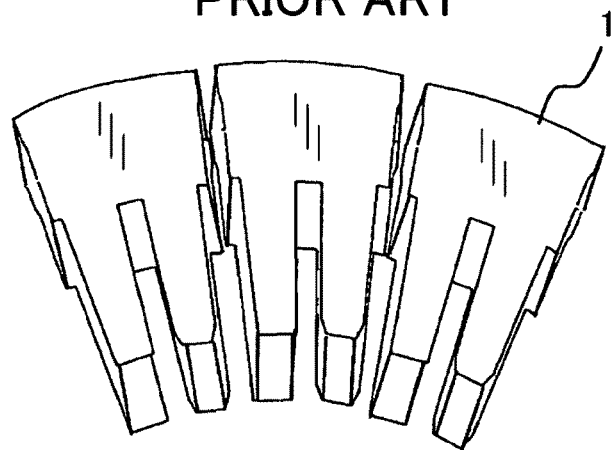
FIG. 1 is a perspective view showing divided cores, each having a arc shape, connected with one another.
Figure 2:
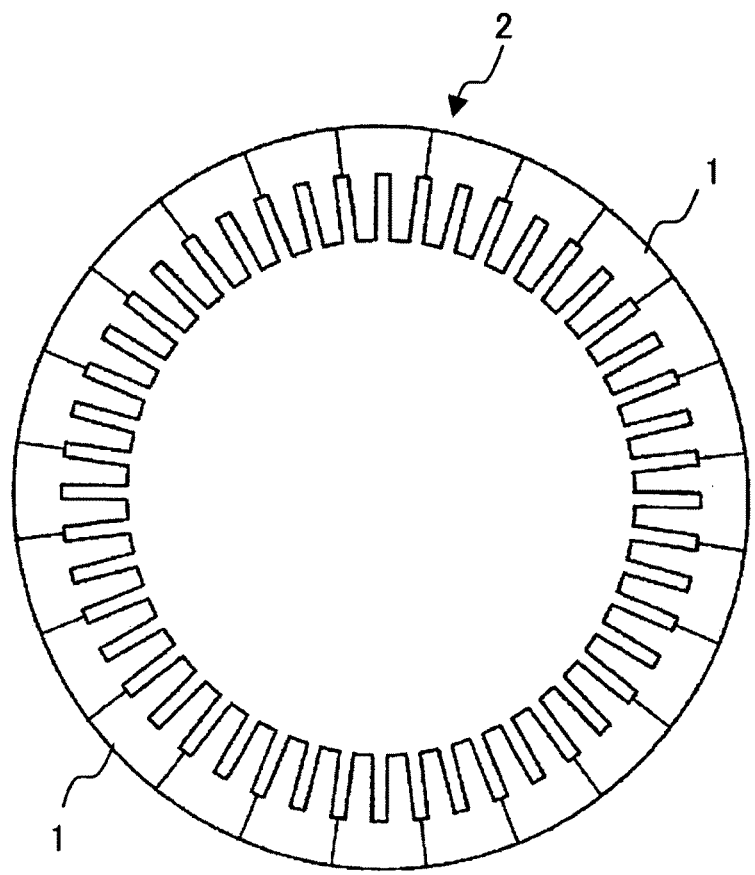
FIG. 2 is a plan view showing a stator core.
Figure 3:
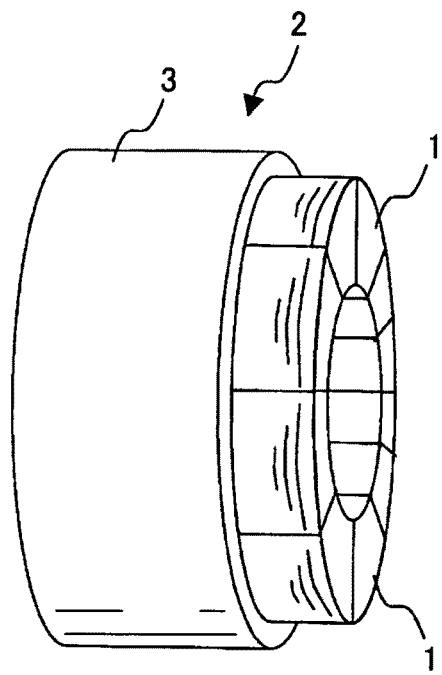
FIG. 3 is a perspective view showing circularly formed divided cores in a state of a shrinkage fit.
Figure 4:
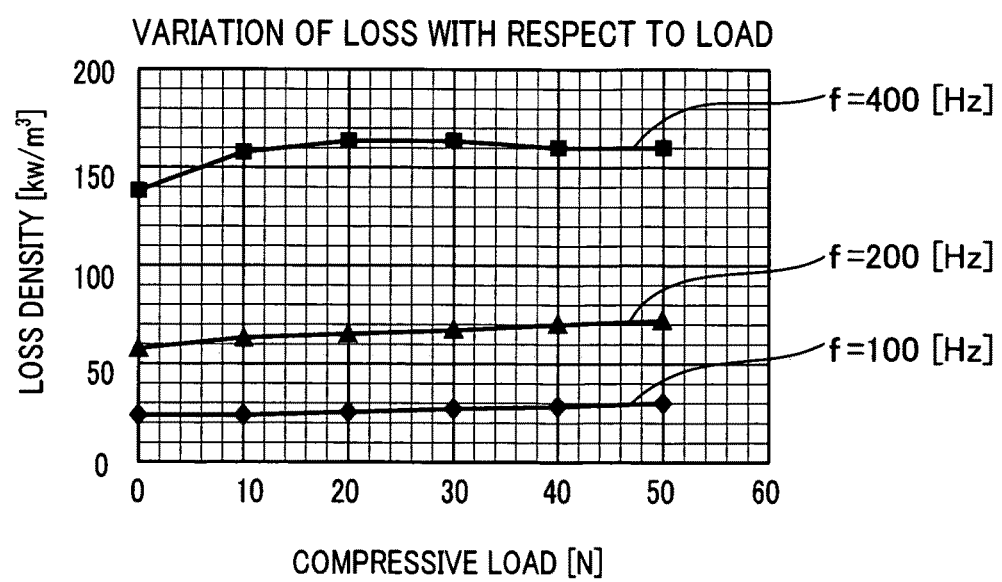
FIG. 4 is a drawing showing a relationship between a compressive load to be applied to a circular core, and a loss density.
Figure 5:
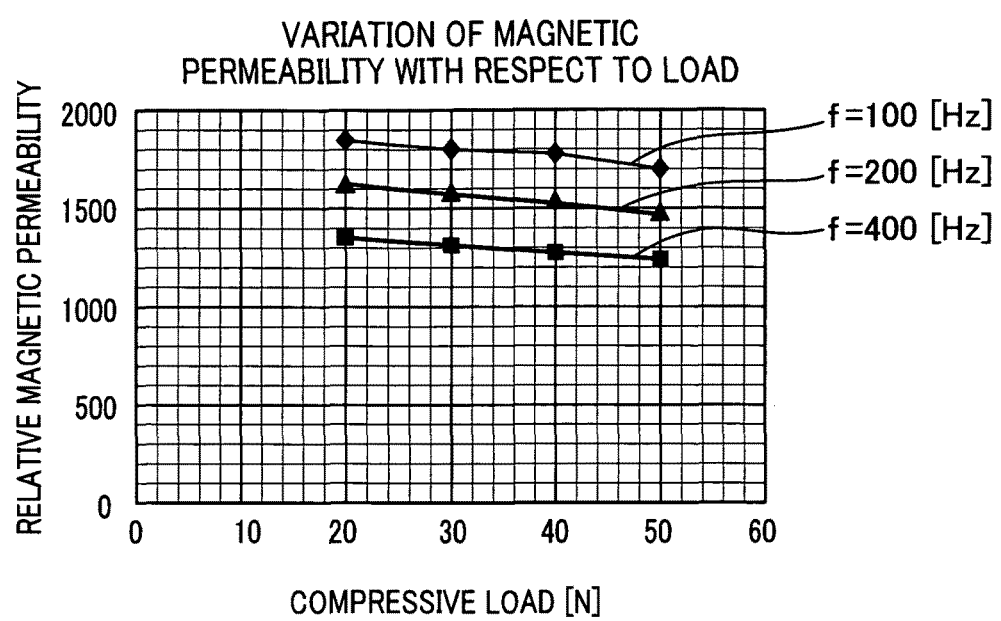
FIG. 5 is a drawing showing a relationship between the compressive load to be applied to the circular core and a relative magnetic permeability.

A preferred embodiment of the present invention will be described below with reference to the drawings. The same reference numerals are denoted in the drawings for portions relating to each other, and description of portions previously described will be avoided.

First Embodiment

Figure 6:
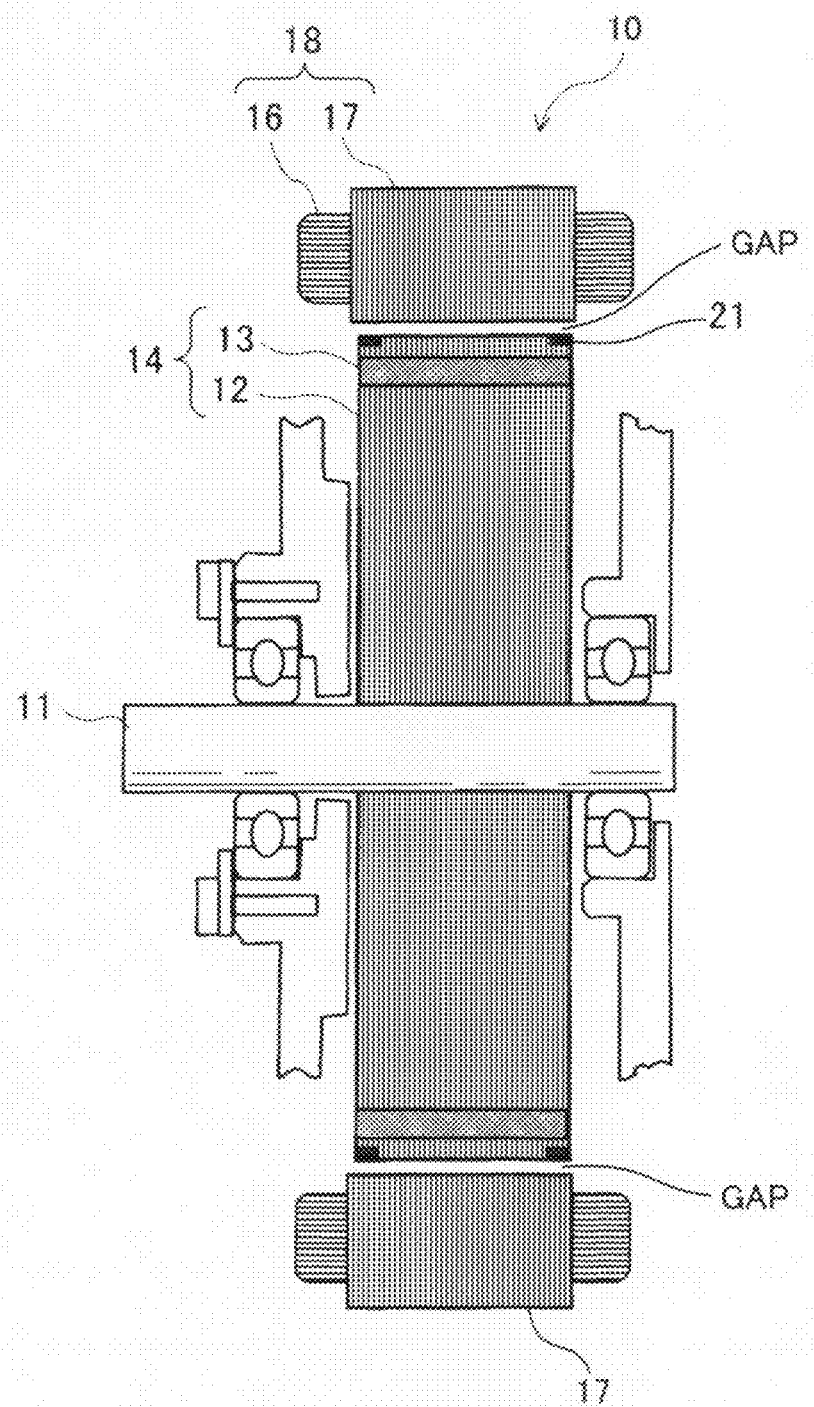
FIG. 6 is a sectional view along a rotational axis showing a configuration of a rotational electrical machine according to a first embodiment of the present invention.

FIG. 6 is a sectional view along a direction of a rotational axis showing a rotating electrical machine relating to a first embodiment of the present invention.

The rotating electrical machine 10 shown in FIG. 6 is mounted on vehicles such as, for example, a hybrid car and an electric automobile. The rotating electrical machine 10 includes a rotor 14. The rotor 14 includes a laminated steel plate 12 that surrounds a rotary axis 11 and consists of a multiple thin steel plates each having a circular form. The rotor 14 further includes a permanent magnet 13 that is embedded in the laminated plate 12 near the outer circumference of the plate 12 in the circumferential direction with a predetermined distance. The rotating electrical machine 10 also includes a stator 18. The stator 18 includes a three-phase winding wire 16 and a stator core 17 which is made of laminated steel plates and winds around the three-phase winding wire 15. The stator 18 is disposed near the outer circumference of the rotor 14 with a predetermined distance, i.e., gap between the stator core 17 and the outer circumference of the rotor 14. The stator 18 has a circular shape, and is connected to an inverter used for a power conversion (not shown). The stator core 17 is made of laminated steel plates and winds around the three-phase winding wire 16.

Figure 7:
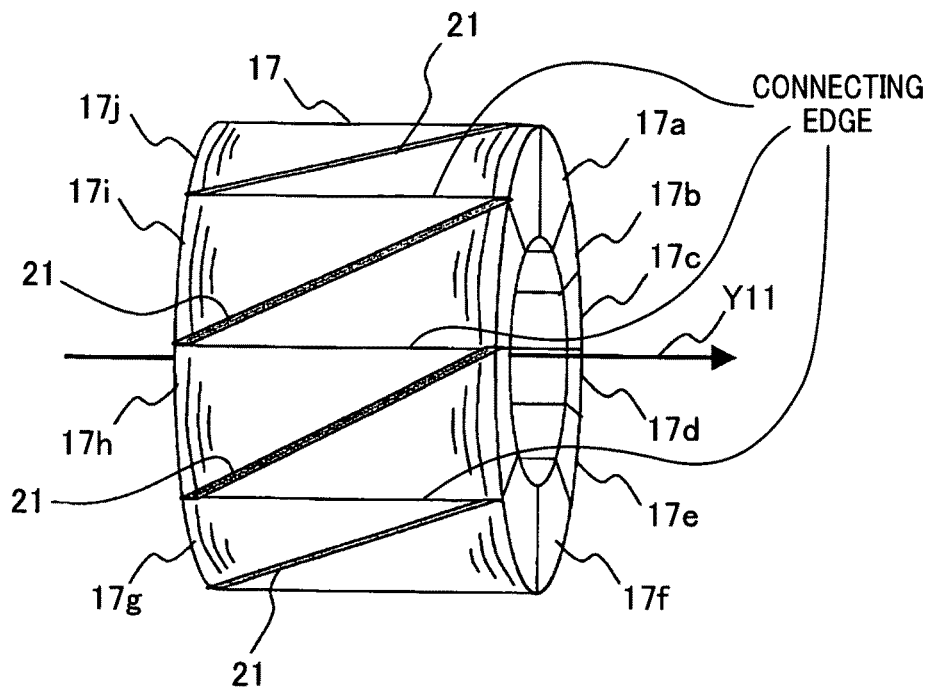
FIG. 7 is a perspective view showing a configuration of a stator core of the rotating electrical machine according to the first embodiment of the invention.

The feature of the embodiment is how the stator core 17 is connected. As shown in FIG. 7, divided cores 17a-17j, each having a arc shape in section perpendicular to the axial direction Y11 of the rotary axis 11, are disposed to form a circular shape. It is noted that each of the divided core has connecting edges which are in parallel to the axial direction Y11 and being adjacent to other divided cores. In the divided cores 17a-17j, there are provided welded portions each of which is diagonally formed between a corner end of a connecting edge, i.e., first connecting edge and an opposite corner end of a neighboring connecting edge, i.e., second connecting edge, thereby providing the welded portion diagonal with respect to the axial direction Y11. In other words, each of the divided cores 17a-17j has a welded portion 21 that is diagonally formed from one corner end of the connecting edge to the opposite corner end of the neighboring connecting edge, where the opposite corner end is located at a section diagonal to the one corner end. The welded portion in this description is designated as a diagonally-welded portion 21.

Each of the divided cores 17a-17j is made of laminated multiple steel plates each having a arc shape, and thus the outer circumference surface of each of the divided cores 17a-17j is integrally secured by the diagonally-welded portion 21. Moreover, since one end of the connecting edge and the other end of the neighboring connecting edge, both in the axial direction Y11, are welded by the diagonally-welded portion 21, all of the divided cores 17a-17j are integrated altogether in a circular form, forming a stator core 17 as a whole.

As described above, in the stator core 17 of the rotating electrical machine according to the first embodiment, the connecting edge and the neighboring connecting edge of the divided cores 17a-17j are welded by the diagonally-welded portion 21 formed in a diagonal direction with respect to the rotational axis 11, whereby the divided cores 17a-17j are integrally formed.

The stator core 17 is formed by welding the divided cores 17a-17j altogether; and thus the conventional shrinkage fit using the circular ring is not required. Accordingly, no compressive stress is applied to the stator core 17, unlike in the conventional prior art where the compressive stress is applied to the circular core by the ring. As a result, the deterioration of the magnetic property of the stator core 17 caused by the compressive stress is avoided, and thus it is possible to prevent the deterioration of the motor loss and improve the motor efficiency.

When the rotor 14 inside the stator 18 is rotated, there is generated a magnetic field between the rotor 14 and the stator 18 in the radial direction, in the circumferential direction, and in the axial direction Y11. In such a case, if the divided cores 17a-17j are welded along the connecting edge, which is in parallel to the axial direction Y11, an eddy current flows at once in the welded portion caused by a variation of the magnetic field generated in both the radial direction and the circumferential direction. This can generate an eddy-current loss caused by an electrical resistance of the iron forming the welded portion.

Unlike the above case, the diagonally-welded portion 21 in the embodiment of the present invention is formed diagonally with respect to the axial direction Y11. Because of the diagonally-welded portion 21, the magnetic field in the axial direction Y11 is generated with a time lag corresponding to the rotation of the rotor 14, and thus the eddy current is dispersed and flows less. Accordingly, it is possible to decrease the eddy-current loss compared to the above configuration having the welded portion along the axial direction Y11, thereby improving the motor efficiency.

Second Embodiment

Figure 8:
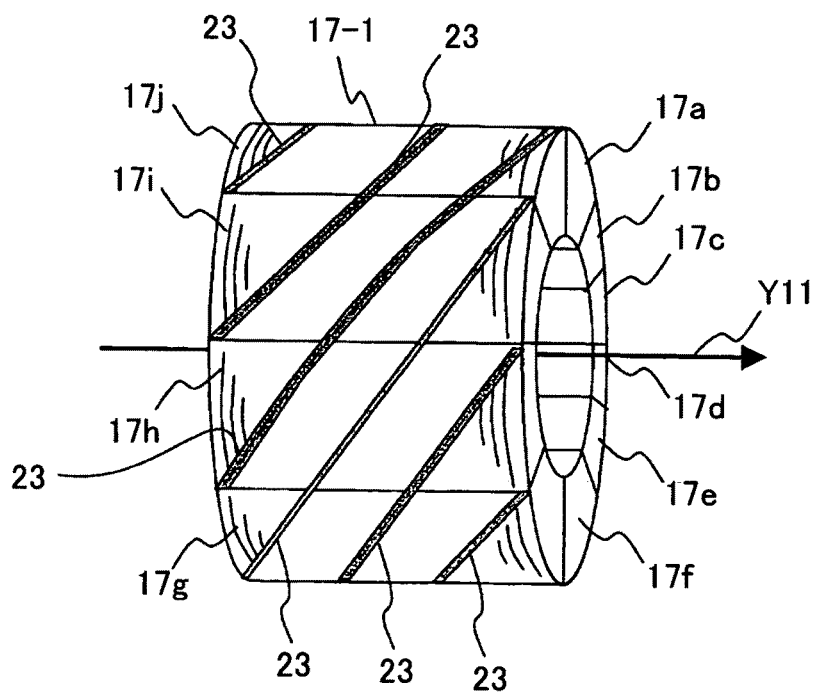
FIG. 8 is a perspective view showing a configuration of the stator core of the rotating electrical machine according to a second embodiment of the invention.

A second embodiment of the present invention will be described below with reference to FIG. 8. In this embodiment, a stator core 17-1 including divided cores 17a-17j has welded portions 23 each of which is formed diagonally with a pitch between two neighboring poles of a rotor 14. That is, the north poles and the south poles are disposed alternately in the rotor 14 by permanent magnets 13 embedded in the rotor 14 in the circumferential direction. Each of the welded portions 23 is formed diagonally from one end of the outer circumferential surface of the stator core 17-1 corresponding to a d-axis of a pole (the d-axis of the north pole, for example), through which the largest magnetic flux flows in the radial direction, to the other end of the outer circumferential surface of the stator core 17-1 corresponding to the d-axis of the neighboring south pole.

Although, in this embodiment, the welded portion 23 is formed diagonally on the outer circumference surface between two d-axes such that the welded portion 23 is formed from one end of one of the d-axes to the other end of the other d-axis with a pitch between two neighboring poles, the welded portion 23 can be formed not only between two d-axes, but with a pitch between two neighboring poles.

In other words, in this embodiment, each welded portion 23 is formed diagonally with respect to the axial direction Y11 from one end of the outer circumference surface of the circularly formed divided cores 17a-17j and the other end thereof, with a pitch between the north pole and the neighboring south pole of the rotor 14. With such a configuration, the outer circumference surface of the laminated steel plates forming each of the divided cores 17a-17j is integrally welded altogether by the diagonally-welded portion 23. Moreover, the connecting edges of the divided cores 17a-17j formed in the axial direction Y11 are also welded by the diagonally-welded portion 23, and thus all of the divided cores 17a-17j are integrally connected in a circular form.

In the stator core 17-1 of the second embodiment of the rotating electrical machine according to the invention, the divided cores 17a-17j are integrally connected by the welding unlike the prior art where the divided cores are connected by the shrinkage fit using the circular ring, so that no compressive stress can be applied to the stator core 17-1 of the present embodiment. This makes it possible to prevent the deterioration of the magnetic property of the stator core 17-1, thereby preventing the motor loss and improving the motor efficiency.

Moreover, all of the divided cores 17a-17j are integrally connected by the welded portions 23 formed on the outer circumference surface thereof with a pitch between two neighboring poles, and thus an eddy current of the north pole and another eddy current of the neighboring south pole flow in the reversed direction, canceling the eddy currents with each other. This allows only a small current to flow, and thus decreases the loss due to eddy current and improves the motor efficiency.

The preferable configurations have been exemplified above as the embodiments of the present invention. The invention, however, is not restricted to those embodiments, and includes other configurations formed within a scope of the invention including one having different diagonal angle of the welded portion with respect to the rotary axis, and one having different points from which the welding is formed.

What is claimed is:

1. A stator core of a rotating electrical machine comprising divided cores circularly disposed via a gap around an outer circumference of a columnar core rotating about a rotary axis, each of the divided cores made of laminated steel plates having a arc shape, wherein the divided cores are integrally connected by welded portions diagonally formed with respect to the rotary axis, and each divided core includes first and second connecting edges which are adjacent to other divided cores, and the welded portions are formed by a welding performed from one end of the first connecting edge in an axial direction to the other end of the second connecting edge in the axial direction.

2. A stator core of a rotating electrical machine comprising divided cores circularly disposed via a gap around an outer circumference of a columnar core rotating about a rotary axis, each of the divided cores made of laminated steel plates having a arc shape, wherein the divided cores are integrally connected by welded portions diagonally formed with respect to the rotary axis, wherein the divided cores are welded between one end of the divided core in the axial direction and the other end of the divided core in the axial direction, the welding being performed with a pitch between a north pole and a neighboring south pole of the rotor.

* * * * *